(12) United States Patent
Rademan et al.

(10) Patent No.: US 12,012,361 B2
(45) Date of Patent: Jun. 18, 2024

(54) GEOPOLYMER CEMENT

(71) Applicant: Premier Magnesia, LLC, West Conshohocken, PA (US)

(72) Inventors: Jerry Elliot Rademan, Atlanta, GA (US); Mark A. Shand, Arden, NC (US); John Kirin Gehret, Miami Beach, FL (US); Peyton Pool, Sr., Port St. Lucie, FL (US)

(73) Assignee: PREMIER MAGNESIA, LLC, West Conshohocken, PA (US)

( * ) Notice: Subject to any disclaimer, the term of this patent is extended or adjusted under 35 U.S.C. 154(b) by 852 days.

(21) Appl. No.: 17/062,910

(22) Filed: Oct. 5, 2020

(65) Prior Publication Data

US 2021/0101832 A1    Apr. 8, 2021

Related U.S. Application Data

(60) Provisional application No. 62/910,878, filed on Oct. 4, 2019.

(51) Int. Cl.
| | | |
|---|---|---|
| *C04B 28/00* | (2006.01) | |
| *B32B 13/08* | (2006.01) | |
| *C04B 18/02* | (2006.01) | |
| *C04B 20/00* | (2006.01) | |
| *C04B 22/06* | (2006.01) | |
| *C04B 38/02* | (2006.01) | |
| *C04B 38/10* | (2006.01) | |
| *C04B 40/00* | (2006.01) | |
| *C04B 40/02* | (2006.01) | |
| *C04B 103/10* | (2006.01) | |
| *C04B 111/00* | (2006.01) | |
| *C04B 111/20* | (2006.01) | |
| *C04B 111/40* | (2006.01) | |

(52) U.S. Cl.
CPC ............ *C04B 28/006* (2013.01); *B32B 13/08* (2013.01); *C04B 18/027* (2013.01); *C04B 20/0048* (2013.01); *C04B 22/066* (2013.01); *C04B 38/02* (2013.01); *C04B 38/10* (2013.01); *C04B 40/005* (2013.01); *C04B 40/0231* (2013.01); *B32B 2607/00* (2013.01); *C04B 2103/10* (2013.01); *C04B 2111/00612* (2013.01); *C04B 2111/2084* (2013.01); *C04B 2111/40* (2013.01)

(58) Field of Classification Search
CPC ................. C04B 28/006; C04B 12/005; C04B 2111/00612; C04B 2111/2084; C04B 2111/40; B32B 2262/101; B32B 2307/306; B32B 5/022; B32B 5/028; B32B 2260/044; B32B 5/20; B32B 2262/0253; B32B 2262/0261; B32B 2262/10; B32B 2262/103; B32B 2264/101; B32B 2266/049; B32B 2419/06; B32B 5/26; B32B 2260/023; B32B 5/024; B32B 5/245; Y02W 30/91
See application file for complete search history.

(56) References Cited

U.S. PATENT DOCUMENTS

| | | | | |
|---|---|---|---|---|
| 5,194,091 | A * | 3/1993 | Laney | C04B 11/28 156/39 |
| 8,183,186 | B2 | 5/2012 | Luo et al. | |
| 9,327,326 | B2 | 5/2016 | Karimi et al. | |
| 9,895,649 | B2 | 2/2018 | Brown et al. | |
| 2003/0181542 | A1* | 9/2003 | Vijn | C04B 40/0039 524/492 |
| 2008/0206128 | A1* | 8/2008 | Hamilton | C04B 2/005 423/636 |
| 2012/0260594 | A1* | 10/2012 | Blackstock | C04B 28/006 52/750 |
| 2013/0284069 | A1 | 10/2013 | Dubey | |
| 2014/0096704 | A1* | 4/2014 | Rademan | C04B 12/025 106/666 |
| 2015/0050486 | A1 | 2/2015 | Kim et al. | |
| 2015/0056437 | A1* | 2/2015 | Deo | C04B 28/188 428/312.4 |
| 2015/0376060 | A1 | 12/2015 | Werz et al. | |
| 2016/0272887 | A1* | 9/2016 | Tao | E02D 3/123 |
| 2017/0057872 | A1* | 3/2017 | Easton | B28B 15/00 |
| 2020/0354540 | A1* | 11/2020 | Palman | C08J 9/35 |

FOREIGN PATENT DOCUMENTS

| | | | |
|---|---|---|---|
| CN | 109776039 | * | 3/2019 |
| WO | 2016168810 A1 | | 10/2016 |
| WO | 20210548826 | * | 3/2021 |

OTHER PUBLICATIONS

Wang et al., electronic translation of CN 109776039, Mar. 2019.*
International Search Report and Written Opinion issued in related Application Serial No. PCT/US2020/054228 dated Jan. 19, 2021.

* cited by examiner

*Primary Examiner* — Anthony J Green
(74) *Attorney, Agent, or Firm* — Brian J. Colandreo; Jeffery T. Placker; Holland & Knight LLP

(57) ABSTRACT

A geopolymer cement and a method of producing the same are provided. A geopolymer cement binder may be provided including a geopolymer precursor and magnesium oxide as an alkali activator. The geopolymer cement binder may be mixed with water using high shear mixing.

24 Claims, 3 Drawing Sheets

GEOPOLYMER CEMENT

CROSS-REFERENCE TO RELATED APPLICATION

This application claims the benefit of U.S. provisional patent application Ser. No. 62/910,878, entitled "Lightweight Magnesium Oxide-Based Geopolymer Cements" and filed on Oct. 4, 2019, the entire contents of which is incorporated herein by reference.

TECHNICAL FIELD

The present disclosure generally relates to geopolymer cements, and more particularly relates to geopolymer cements utilizing magnesium oxide as an alkali activator.

BACKGROUND

Currently the construction board market is generally dominated by gypsum-based core materials. For example, most residential and commercial building structures typically utilize wall, floor and/or ceiling panels having gypsum-based core boards. While gypsum-based products may provide some degree of fire resistance, they may often exhibit limited fire resistant properties when used in the thicknesses now specified in many current building codes when used in various fire-barrier assemblies. For example, typically 5/8" thick Type C and Type X gypsum boards are only able to provide 1-hour fire rating in the industry accepted ASTM E119 fire wall assembly test. Although various fire resistant additives, such as vermiculite, can be incorporated into the gypsum core building panels, the inherent ability of the gypsum cores to slow down smoke and fire spread has limits. Additionally, gypsum core boards are often not especially strong on their own, and actually develop up to a significant portion of their flexural and compressive strengths from either a paper-based encapsulating protective sheathing, or in some cases, a fiberglass matting material. Unfortunately, a paper sheathing is also flammable and may be weakened by water and/or moisture intrusion, which can also lead to dangerous mold and/or mildew formation, in some situations, as well as weakening on and within the gypsum cores, which may give rise to the need to replace the gypsum-based boards. Despite some of these potential issues, gypsum-based boards have gained widespread use over the years because these boards are easy for drywall contractors to handle and apply based on relatively light-weights, easy score & snap properties, fastener ability properties, are easy to make smooth and assembled with joint compounds and are relatively inexpensive.

SUMMARY

According to an implementation a method of producing geopolymer cement may include providing a geopolymer cement binder. The geopolymer cement binder may include a geopolymer precursor, magnesium oxide as an alkali activator. The method may further include mixing the geopolymer cement binder with water using high shear mixing.

One or more of the following features may be included. The geopolymer precursor may include a material containing amorphous silicates of one or more of calcium, aluminum, and magnesium. The geopolymer precursor may include one or more of: slag cements; fly ash; metakaolin; fumed silica; and rice husks. The geopolymer cement binder may include between about 10% to about 95% of the geopolymer precursor by weight of the geopolymer cement binder.

The magnesium oxide may include magnesium oxide calcined to exhibit a caustic magnesia activity neutralization time of between about 9 seconds to about 30 seconds using a 1.0N acetic acid. The magnesium oxide may exhibit a magnesium oxide purity from between about 75% to about 99%. The geopolymer cement binder may include between about 1% to about 50% magnesium oxide by weight of the geopolymer cement binder.

The geopolymer cement binder may further include a co-alkali activator. The co-alkali activator may include one or more of: sodium silicate; potassium silicate; sodium metasilicate having a formula $Na_2SiO_3 \cdot nH_2O$, where n=one of 5, 6, 8, 9; sodium hydroxide; sodium aluminate; sodium carbonate; hydrated lime; quick lime; dolime; hydrated dolime; potassium oxide; lithium oxide; alumina; iron oxide; nickel oxide; copper oxide; sodium lactate; ordinary Portland cement; and calcium gluconate. The geopolymer cement binder may include an amount of co-alkali activator that is equal to or less than an amount of the magnesium oxide by weight.

The method may further include carbonating the geopolymer cement one of during mixing and after mixing. Carbonating the geopolymer cement may include adding carbon dioxide to one or more of the water and the geopolymer cement. Carbonating the geopolymer cement may include providing the geopolymer cement binder further including a powdered carbonate. The powdered carbonate may include one or more of sodium carbonate, lithium carbonate, sodium bicarbonate, sodium percarbonate, sodium sesquicarbonate, potassium carbonate, and potassium bicarbonate.

The method may further include providing a density reduction of the geopolymer cement. Providing the density reduction of the geopolymer cement may include aerating the geopolymer cement. Aerating the geopolymer cement may include physically aerating the geopolymer cement. Aerating the geopolymer cement may include chemically aerating the geopolymer cement using one or more of a chemical aeration agent and a foaming agent. Providing the density reduction of the geopolymer cement may include incorporating a density reduction additive with one or more of the geopolymer cement binder and the geopolymer cement. The density reduction additive may include a lightweight material, including one or more of expanded polymers, expanded polystyrene, perlite, vermiculite, hollowed glass beads, crushed glass, zeolites, and mica.

The geopolymer cement binder may further include one or more of a ceramic material and a heat expandable material. The ceramic material and/or the heat expandable material may provide one or more of heat resistance and thermal shock resistance for the geopolymer cement, including, but not limited to, cordierite, mullite, steatite, magnesia stabilized zirconia, ceria stabilized zirconia, olivine & unexpanded perlite. The method may further include reinforcing the geopolymer cement. Reinforcing the geopolymer cement may include providing the geopolymer cement binder further including chopped fibers including one or more of fiberglass, basalt fibers, polyolefin fibers, hemp fibers, stainless steel fibers, and nylon fibers. Reinforcing the geopolymer cement may include providing one of a woven and a non-woven facing for the geopolymer cement. Reinforcing the geopolymer cement may include providing one of a woven and a non-woven internal reinforcement.

The geopolymer cement binder may further include a viscosity control agent. The viscosity control agent may include a viscosity reducer. The viscosity control agent may include a thickener. The geopolymer cement binder may further include an alkali stabilizing activator to increase the pH of the geopolymer cement.

Mixing the geopolymer cement binder with water high shear mixing may include mixing with an overhead-type mixer having a toothed dispersion blade. Mixing the geopolymer cement binder with water using one or more of high speed mixing and high shear mixing may include mixing with a rotor-stator high shear in line mixer.

The method may further include shaping the geopolymer cement, in an uncured state, into a sheet. The method may further include facing at least one surface of the sheet with a facing material. The method may further include applying a reinforcing layer to at least one surface of the sheet.

According to another implementation, a construction panel may include a geopolymer cement sheet comprising a geopolymer precursor reacted with a magnesium oxide alkali activator and water under one or more of high-speed mixing and high shear mixing. The construction panel may further include one of a facing material and a reinforcing layer bonded to a surface of the geopolymer cement sheet.

DESCRIPTION OF EXAMPLE EMBODIMENTS

Figure 1:
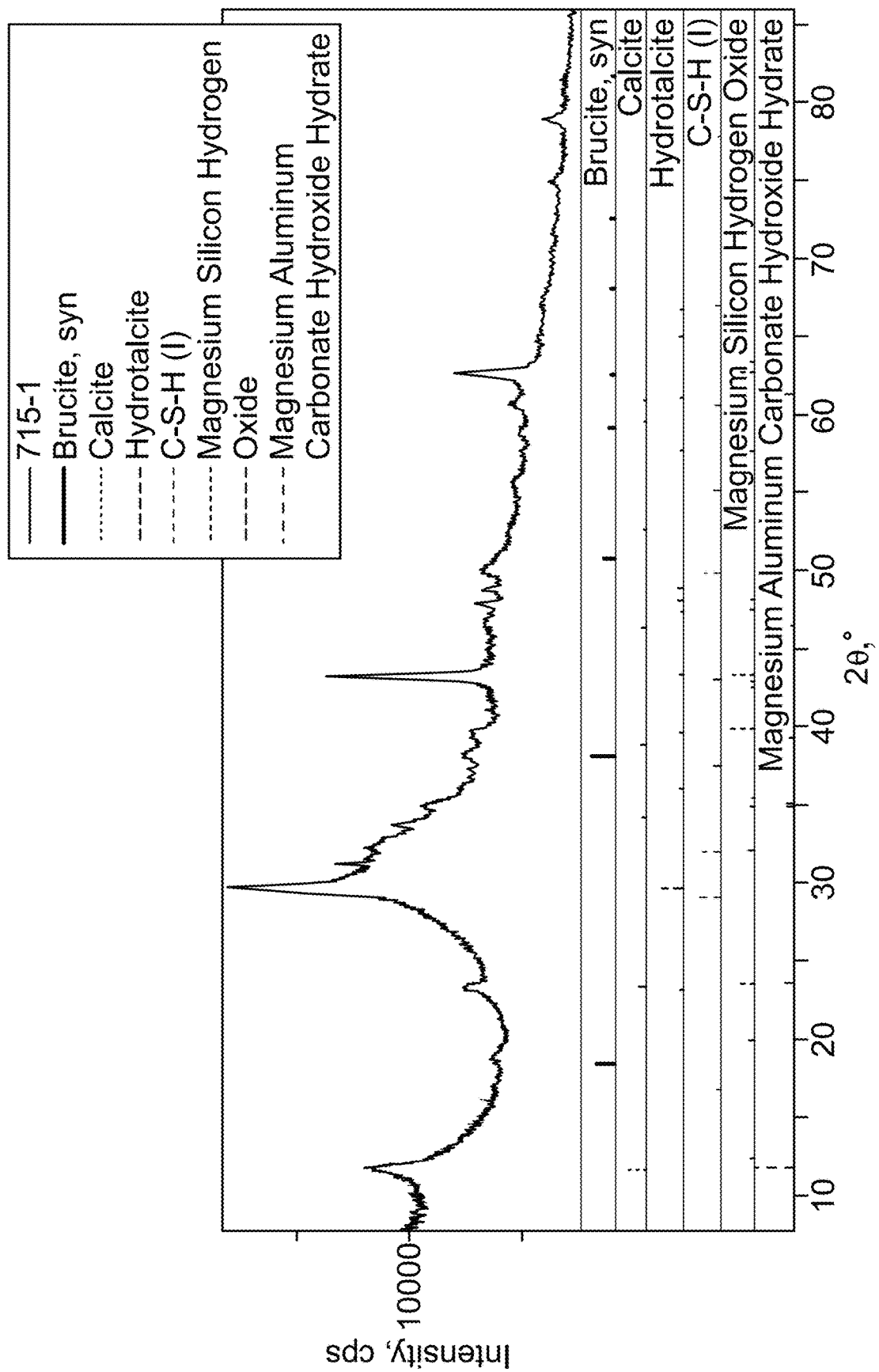
FIG. 1 is an x-ray diffraction plot of an example geopolymer cement consistent with an illustrative example embodiment.

In general, the present disclosure relates to magnesium oxide based geopolymer cements. For example, geopolymer precursors which may be reacted with magnesium oxide and water to form geopolymer cements. In some situations, magnesium oxide having particular grades and/or reactivities may be mixed with geopolymer precursors and water under specific mixing conditions to form geopolymer cements. In some implementations, the resultant geopolymer cements may, for example, exhibit some degree of heat and/or fire resistance. In some implementations, the resultant geopolymer cements may be utilized in connection with construction products, such as interior and/or exterior wall panel products (e.g., including, but not limited to, wall panels as may be attached to construction framing to form an interior or exterior surface of a wall, ceiling, or the like, and may be used in similar applications as wallboard and/or drywall), construction panels, fire-separation wall assemblies, shaft-liner assemblies and/or various other construction products. It will be further appreciated from the following description that geopolymer cements consistent with the present disclosure may be utilized in a wide variety of other applications.

As generally discussed above, in some illustrative example embodiments, a geopolymer cement may generally be produced by mixing a geopolymer cement binder, or binder system, with water. Consistent with some embodiments, the geopolymer cement binder may include at least a geopolymer precursor and magnesium oxide as an alkali activator. The geopolymer cement binder may be mixed with the water using high speed mixing techniques and/or high shear mixing techniques. In some implementations, the geopolymer cement binder may include various additional ingredients and/or components. In implementations in which the geopolymer cement binder may include additional ingredients and/or components, the additional ingredients and/or components may alter one or more chemical and/or mechanical characteristics of the resultant geopolymer cement.

Consistent with some illustrative examples of the present disclosure, the geopolymer cement may set at ambient temperatures. That is, the geopolymer cement may not require heating of the mixture to produce setting, or hardening, of the geopolymer cement. Consistent with some implementations, the geopolymer cements may utilize minimally processed natural materials or industrial byproducts, which may allow carbon footprint reductions (e.g., which may include a significant reduction, in some embodiments), while also being very resistant to many of the durability issues that can plague conventional concretes (such as concretes formed utilizing ordinary Portland cements).

As generally discussed above, consistent with embodiments of the present disclosure, a geopolymer cement binder may be utilized that may include a geopolymer precursor. Consistent with some embodiments, a geopolymer precursor may include an inorganic, amorphous alkali metal or metal silicate material, such as an aluminosilicate. Without limitation to particular mechanisms, in some implementations such geopolymer precursors may react with alkaline activators that may chemically attack the aluminosilicate material to release reactive chemical species such as hydrated orthosilicate and aluminate anions, as well as $Ca^{2+}$, $Al^{3+}$ and $Mg^{2+}$ cations. These species may then react and condense into reaction products, such as C-A-S-H (calcium, aluminum silicate hydrates) gels like, for example, similar to those seen in Portland cement. Dependent upon the level of Ca present in the system, condensation of three-dimensional alkaline polymer, N-A-S-H (sodium, aluminum, silicate hydrates) gels can occur which can be regarded as zeolite precursor. It is also possible that a hybrid polycondensation can occur which results in the formation of a complex mix of cementitious gels, including C-A-S-H (with the inclusion of sodium into its composition) and (N, C)-A-S-H (high calcium content N-A-S-H gels). A phase known as hydrotalcite ($Mg_6Al_2CO_3(OH)_{16} \cdot 4H_2O$) may also form which may contribute to early strength and incremental fire resistance of the cementitious system.

Consistent with some embodiments, the geopolymer precursor may include a material containing amorphous silicates of one or more of calcium, aluminum, and magnesium. Further, consistent with some embodiments, the geopolymer precursor may include slag cements (e.g., such as slag cements from blast furnaces, such as ground granulated blast furnace (GGBF) slag, or other slag generated from the productions of steel. In some embodiments, the geopolymer precursor may include fly ash (e.g., including any grade of fly ash, such as class C or class F). Consistent with some embodiments, class C fly ash may be beneficial as it may have a higher content of calcium silicate, which may be useful in forming complexes with the magnesium in the magnesium oxide to form the magnesium-calcium-silicate-hydrate crystalline cement phase. In some embodiments, the geopolymer precursor may include one or more of metakaolin, fumed silica (microsilica), and rice husks. It will be appreciated that combinations of geopolymer precursors may be utilized in connection with embodiments of the present disclosure.

Consistent with some embodiments, magnesium activated alkali geopolymer cement formulations using slag, fly ash, silica fume, metakaolin, rice husks, or any other known geopolymer cement precursors that can react with certain grades of magnesium oxide to form phases of Magnesium Silicate Hydrate (M-S-H), Calcium Silicate Hydrate (C-S-H), hydrotalcite, calcium-magnesium silicate hydrate, and calcium-magnesium-aluminum silicate hydrate cement phases, as well as alkaline aluminosilicate hydrate gel or zeolite precursor, may be utilized, which may form an effective "refractory type cement" that may also exhibit water and mold resistance.

Consistent with the present disclosure, the geopolymer cement binder may include between about 1% to about 95% of the geopolymer precursor by weight of the geopolymer cement binder. Consistent with some illustrative example embodiments, the geopolymer cement binder may include between about 10% to about 95% of the geopolymer precursor by weight of the geopolymer cement binder. In some particular implementations, the geopolymer cement binder may include between about 45% to about 75% of the geopolymer precursor by weight of the geopolymer cement binder. In some illustrative example embodiments, the geopolymer cement binder may include between about 1% to about 10% of the geopolymer precursor by weight of the geopolymer cement binder. It will be appreciated that other ranges of geopolymer precursor may equally be utilized.

Consistent with some embodiments of the present disclosure, magnesium oxide may be utilized as the primary alkali activator for the geopolymer cement. In some such implementations, the use of magnesium oxide as the primary alkali activator may avoid and/or reduce the usage of extremely highly alkali activators (e.g., activators having pH higher than the pH of magnesium oxide), such as sodium hydroxide, sodium meta-silicate, or even hydrated or unhydrated Lime, etc., which may present storage, safety, and/or handling concerns. Further, consistent with some implementations, the proper mixing of magnesium oxide with geopolymer cement precursors (e.g., such as slag, fly ash, etc.) and water may aid in the development of desirable cement phases, which may provide increased fire-resistant properties in the resultant cement.

Consistent with some embodiments, the magnesium oxide may include magnesium oxide calcined to exhibit a caustic magnesia activity neutralization time of between about 9 seconds to about 30 seconds using a 1.0N acetic acid. Further, in some implementations, the magnesium oxide may exhibit a magnesium oxide purity from between about 75% to about 99%. In some illustrative example embodiments, the magnesium oxide may exhibit a magnesium oxide purity from between about 89% to about 95%. For example, in some implementations, it has been found that the magnesium oxide concentration and type may influence the ability of the magnesium oxide to activate the geopolymer precursors, and/or may influence the properties of the resultant geopolymer cement. For example, the magnesium oxide may be from a naturally calcined grade derived from mined magnesite ($MgCO_3$), or from synthetic grades precipitated from magnesium salt brines or other salt waters, or from flash calcined grades. In some implementations, the highest surface reactive grades, such as Flash calcined, synthetic grades and other high surface reactive grade, may provide beneficial results. One such grade of magnesium oxide may include a relatively highly reactive natural (e.g., derived from mined Magnesite) grade that may be calcined in a Herreshoff multi-hearth furnace that exhibit a caustic magnesia activity neutralization time of between about 9 seconds to about 30 seconds using a 1.0N acetic acid. A product called MAGOX® 93HR produced and marketed by Premier Magnesia, LLC is an example of such a grade. An example of a synthetic highly reactive grade of magnesium oxide is MagChem 30, 40 or 50 produced by Martin Marietta, Inc. with activity neutralization times ranging from 8 seconds to as high as 21 seconds. Flash Calcined magnesium oxide grades may also be useful, e.g., as they can produce activity neutralization times ranging from 12 seconds up to 23 seconds or more.

Consistent with some experimental embodiments, various geopolymer cement precursors were tested that contain $SiO_2$, $Al_2O_3$, CaO, $Fe_2O_3$, ($Na_2O$ and $K_2O$. These materials have been known to be "polymerizable" via inorganic hydration and crystalline phase formation routes. Although they could often times form superior cements compared to gypsum/stucco or ordinary Portland cements (OPC), the resultant cements have been observed to have issues with early strength development, excessive cracking from overly aggressive high alkalinity activators, such as sodium meta-silicate, caustic soda (NaOH) or various forms of lime (CaO). Consistent with the present disclosure, it has been discovered that the use of a proper grade of magnesium oxide may overcome and/or mitigate at least some, if not all, of these above issues. As noted above, consistent with some implementations, grades of magnesium oxide that have been found to be effective may include highly reactive grades that are calcined in a Herreshoff multi-hearth furnace that exhibit a caustic magnesia activity neutralization time of between about 9 seconds to about 30 seconds using a 1.0N acetic acid. The use of this type of MgO grade may provide improved cement properties while suitable and sustainable alkalinity activation of stated geopolymer cements can be achieved without causing cracking or strength loss.

In some situations, magnesium oxide has been observed to act as a cement shrinkage compensation admixture in Portland-based concretes by expanding during hydration compensating from OPC's shrinkage during the same hydration period. Consistent with some implementations, the use of magnesium oxide as an alkali activator for the geopolymer precursors may provide the additional benefit of reducing potential cement shrinkage during the curing process of the geopolymer cement. It is observed that not all magnesium oxide may be consumed in the geopolymer reaction, which may allow for shrinkage reduction or compensating activity. Residual magnesium oxide may also provide additional environmental benefit of absorbing atmospheric $CO_2$, which may help reduce greenhouse gases, e.g. hydrotalcite formation.

Consistent with the present disclosure, the geopolymer cement binder may include between about 1% to about 50% magnesium oxide by weight of the geopolymer cement binder. Further, in some particular implementations, the geopolymer cement binder may include between about 5% to about 25% magnesium oxide by weight of the geopolymer cement binder.

Consistent with some implementations of the present disclosure, the geopolymer cement binder may further include a co-alkali activator. For example, in some implementations a higher pH (e.g. as compared the pH of 10-10.5 provided by magnesium oxide alone) may be beneficial to generate a desired cure time or crystalline phase, co-alkali activators may be used on combination with magnesium oxide. Consistent with various example embodiments, the co-alkali activator may include one or more of: sodium silicate; potassium silicate; sodium metasilicate having a formula $Na_2SiO_3 \cdot nH_2O$, where n=one of 5, 6, 8, 9; sodium hydroxide; sodium aluminate; sodium carbonate; hydrated lime; quick lime; dolime; hydrated dolime; potassium oxide; lithium oxide; alumina; iron oxide; nickel oxide; copper oxide; sodium lactate; ordinary Portland cement (OPC); calcium aluminate, calcium sulfa aluminate and calcium gluconate. Consistent with some illustrative example embodiments, OPC, calcium aluminate, and calcium sulfoaluminate may additionally and/or alternatively act as co-cements. For example, the OPC, calcium aluminate, and/or calcium sulfoaluminate (CSA) may form additional and/or alternative cement domains within the final geopolymer cement.

Consistent with some embodiments, the geopolymer cement binder may include an amount of co-alkali activator that is equal to or less than an amount of the magnesium oxide by weight. For example, consistent with some experimental embodiments, it has been observed that beneficial results may be achieved when the magnesium oxide is used as the dominant reactor/activator for the geopolymer cement. A phenomenon has been observed when other alkali activators are used in combination with magnesium oxide (as described in greater detail below). For one, it has been observed that the formation of Magnesium Silicate Hydrate (M-S-H) and Magnesium Aluminate Hydrates and Magnesium-Calcium Silicates and Magnesium-Calcium Aluminate Hydrates may be significant crystalline phases that produce the necessary "glue" that may, at least in part, determine and/or influence the overall compressive and flexural strengths as well as fire-resistance some implementations of the geopolymer cements herein. Some suitable geopolymer precursor materials, such as slag, fly ash, and other, are believed to include sufficient calcium content to be reacted with magnesium oxide if they are liberated utilizing the high-speed mixing and/or high shear mixing (as discussed in greater detail below). However, it is believed that too much competition from the other non-magnesium reactants may slow down or even stop the necessary magnesium oxide reactions from forming the proper cement phases. Therefore, if too much co-alkali activators such as hydrated "Slaked" lime ($CaOH_2$) or unhydrated "quick" lime (CaO), sodium, potassium, or calcium silicates, or other alkaline co-reactants are used, the alkaline co-reactants may compete with the reactivity of the magnesium oxide and potentially weaken the at least some properties of the resultant geopolymer cements. Therefore, for example, if any form of lime is used, the usage rate, individually or in combination with any other co-reactants, may desirably be kept equal to, or less than, the total concentration of the magnesium oxide in the geopolymer cement binder. For example, in one particular experimental example, it was found that using a 16% level of Quick Lime with 11% of magnesium oxide caused the cement mix to expand excessively and cause cracking of the formed cements. It will be appreciated that, in other implementations, depending upon the co-alkali activator, the reactivity of the magnesium oxide, the specific geopolymer precursor, and/or the relative quantities of one or more of the foregoing in the geopolymer cement binder, and/or other components which may be include, it may be possible to utilize a co-alkali activator in an amount greater than the amount of the magnesium oxide.

For example, in some embodiments room temperature hardening of the geopolymer cement may rely on the addition of magnesium and calcium cations in reaction with similar ions from a geopolymer precursor (e.g., iron blast furnace slag, or other geopolymer precursors, as discussed herein). As such, in some implementations, the potential use of magnesium oxide, in conjunction with Hydrated Lime ($Ca(OH)2$) have been found, in certain embodiments, to help harden certain geopolymer cement formulations. As discussed above, in some situations, the potential use of any calcium derivative included at levels above (or in some implementations, equal to) the included magnesium oxide may interfere with reaction of the magnesium oxide with the geopolymer precursor. Additionally, in some experimental observations it has been found that the inclusion of calcium compounds (e.g., as co-alkali activators) may provide heat resistance to construction materials below 1,000 degrees F. However, in some implementations the inclusion of calcium compounds may provide relatively poor heat stabilizing effects above 1,000 degrees F. Accordingly, the inclusion of calcium compounds (e.g., as co-alkali activators), as well as the level of inclusion, may be application dependent.

Consistent with some embodiments, the geopolymer cement may be carbonated one of during mixing and after mixing. For example, in some experimental embodiments, it was observed that pre-carbonating a magnesium oxide-geopolymer cement may provide improved physical and thermally stable magnesium carbonate crystalline cement phases. In some embodiments, carbonating the geopolymer cement may include adding carbon dioxide to one or more of the water and the geopolymer cement. For example, in some embodiments, carbon dioxide may be bubble through, and/or injected through, the mix water and/or through the mixed geopolymer mix prior to setting (e.g., which the geopolymer cement mixture is in a slurry and/or at least partially fluid state). In some embodiments, it has been observed that carbonating the geopolymer cement (e.g., as through the use of carbon dioxide, as described above) may provide one or more of pH control (e.g., lowering of the pH), increased UV stability, water resistance, and/or decreased permeability, especially at early age, as well, in some embodiments, provide early age strength development.

In addition/as an alternative to carbonating the mix water and/or mixed geopolymer cement using carbon dioxide, carbonating the geopolymer cement may include providing the geopolymer cement binder further including a powdered carbonate, such as, but not limited to, adding various alkali metal carbonates. The powdered carbonate may include one or more of sodium carbonate, lithium carbonate, sodium bicarbonate, sodium percarbonate, and sodium sesquicarbonate. In some implementations, the use of powdered carbonates (e.g., which may be mixed with the powdered phase of the magnesium oxide and geopolymer precursor of the geopolymer cement binder). As generally discussed above, in some embodiments, these carbonates may provide early aged strength, increased UV stability and/or incremental water and/or moisture vapor transmission resistance to the cured magnesium oxide-based geopolymer matrices of the geopolymer cement.

Consistent with some embodiments, it may be desirable to provide a relatively lightweight geopolymer cement (e.g., as compared with other geopolymer cements consistent with the present disclosure). Accordingly, in some illustrative example embodiments, a density reduction may be provided for the geopolymer cement. For example, in some applications, such as, but not limited to, interior and/or exterior wall panels or construction panels for residential or commercial buildings, it may be desirable to decrease the weight of a given panel. Consistent with some example embodiments, it may be possible to achieve density reduction of the geopolymer cements of up to as much as 75%, as compared to geopolymer cements not including a density reduction. It will be appreciated that, for example in the context of interior and/or exterior wall panel products or construction panel products, such a density reduction may provide multiple advantages, such as reduced shipping costs, ease of installation, and static loads placed on a structure utilizing the panels, etc.

According to various embodiments, providing the density reduction of the geopolymer cement may include aerating the geopolymer cement. Aerating the geopolymer cement may include physically aerating the geopolymer cement. For example, air may be bubbled through, or injected through, the geopolymer cement (e.g., after mixing of the cement, but prior to setting). In some implementations, the carbonation of the geopolymer cement may also effectuate a density reduction, e.g., by bubbling or injecting carbon dioxide through the cement mix. Further, in some embodiments, aerating the geopolymer cement may include chemically aerating the geopolymer cement using one or more of a chemical aeration agent and a foaming agent. For example, in one particular illustrative example embodiment, pre-carbonating and aerating the magnesium oxide-based geopolymer cement (e.g., which can, in some implementation, be utilized for construction materials) may be accomplished by feeding pressurized carbon dioxide into the cement during, and/or after, mixing with the pressurized feeding of products like HYONIC PFM 33 (e.g., which may include an anionic surfactant produced by GEO Specialty Chemicals, Inc., and/or another anionic surfactant), proteinaceous surfactants (e.g., such as Mearlcrete, which may include a protein based surfactant available from Aerix Industries), and/or any other aerating/foaming agents applied integrally or by means of injection into the matrix by use of a foam generator.

According to some embodiments, providing the density reduction of the geopolymer cement may include incorporating a density reduction additive with one or more of the geopolymer cement binder and the geopolymer cement. According to various embodiments, the geopolymer cement may include between about 1% to about 70% density reduction additives by volume of the geopolymer cement. In some embodiments, the inclusion of the density reductions additives may reduce the density of the geopolymer cement by between about 1% to about 60%. The density reduction additive may include a lightweight material, including one or more of expanded polymers, expanded polystyrene, perlite, expanded and unexpanded vermiculite, hollowed glass beads, crushed glass. As will be appreciated, as used herein, "lightweight" is intended to include a material having a density that is less than the density of pure geopolymer cement, such that the inclusion of the lightweight material results in an overall density reduction of the geopolymer cement. Consistent with various embodiments, the density reduction additive may be included with the geopolymer cement binder and/or may be added to the geopolymer cement during and/or after mixing (but before setting of the geopolymer cement). According to some embodiments, the incorporation of the density reduction additives and/or aeration may still achieve a structure (such as an interior and/or exterior wall panel product, construction panel, etc.) having suitable structural characteristics (e.g., compressive and/or flexural strength), sound barrier properties, and fire resistance, while realizing a decreased product weight.

It will be appreciated that in some illustrative example embodiments the density reduction agents may generally be alkali resistant and/or stable. For example, magnesium oxide may generally have a pH of about 10-10.5. Further, and as generally discussed herein, in some implementations additional alkaline materials may be included. As such, in some implementations the density reduction agents (whether aerating agents and/or lightweight additives) may be stable and/or resistant to pH ranges up to a pH of 10 and/or up to higher pH ranges (e.g., pH ranges between 10-14).

Consistent with some embodiments, the geopolymer cement binder may further include one or more of a ceramic material and a heat expandable material. The ceramic material and/or the heat expandable material may provide one or more of heat resistance and thermal shock resistance for the geopolymer cement. For example, in some embodiments, the ceramic materials and/or the heat expandable materials may provide additional heat resistance and/or thermal shock resistance by expanding and compensating for any cement shrinkage on excessive heat cool down conditions. In some implementations, the materials that may be used for achieving lower core cement thermal shrinkage may include, but are not limited to, refractory materials, such as ball clays, with or without vermiculite. In some implementations utilizing vermiculite the vermiculite may include a fine, unexpanded grade, e.g., which may expand upon fire exposure. Additional and/or alternative materials may include cordierite, mullite, steatite, magnesia stabilized zirconia, ceria stabilized zirconia, olivine & unexpanded perlite. It will be appreciated that combinations of the foregoing materials may be utilized, as well as other materials that may exhibit similar characteristics and/or properties.

Consistent with some example embodiments, geopolymer cements consistent with the present disclosure may demonstrate low and/or extremely low shrinkage in high temperature exposures. The low shrinkage may be particularly realized, e.g., when compared to gypsum-based construction wall boards. In some experimental embodiments shrinkage as low as 1% of a board material's weight before fire exposure, e.g., as compared to an average of 5% observed for gypsum boards of similar thicknesses. In some implementations, it may be possible to realize even lower shrinkage (e.g., as may be required for certain applications). In some such implementations, the addition of refractory materials such as ball clays with, or without, vermiculite materials may be utilized. For example, as mentioned above, advantage results may be realized through the use of ball clays include a fine unexpanded grade of vermiculite that may upon fire exposure, which may compensate for thermal shrinkage, especially in a thermal shock situation.

In some embodiments, the geopolymer cement may be reinforced. Reinforcing the geopolymer cement may include, for example, providing the geopolymer cement binder further including chopped fibers. Example fibers may include one or more of fiberglass, basalt fibers, polyolefin fibers, stainless steel fibers, and nylon fibers. Examples of glass fiber types used that may be integrally dispersed into the geopolymer with MgO cement binders may include, but are not limited to, glass fibers of E-glass, A-glass, AR-glass, C-glass, D-glass, ECR-glass, R-glass and/or S-glass. In the embodiments where higher pH activators are included (e.g., greater than pH of 10.0), the AR-glass type fiber may be chosen as it has higher Alkali Resistance (AR). Consistent with various embodiments, reinforcing fibers may be included at loading levels of between about 0.5% to about 5% by weight of the geopolymer cement binder. In some particular embodiments, reinforcing fibers may be included at loading levels of between 1% to about 3% of the geopolymer cement binder. Integrating the fibers into the geopolymer matrix may mechanically reinforce the body of the geopolymer cement. For example, in an example implementation in which the geopolymer cement may be used as an interior and/or exterior wall panel or construction panel, the reinforcing fibers may increase the flexural strength of the panel. Further, the reinforcing fibers may aid in keeping the panel in one piece, e.g., by bridging any formed cracks during fire or heat exposure.

In addition/as an alternative to reinforcing fibers mixed into the geopolymer cement, in some example embodiments reinforcing the geopolymer cement may include providing one of a woven and a non-woven facing for the geopolymer cement. For example a woven or non-woven fabric, scrim, or mesh of any of the foregoing fiber types may be adhered to an exterior surface of a geopolymer cement structure and/or fully or at least partially embedded into an exterior surface of a geopolymer cement structure. For example, in some embodiments the geopolymer cement may be used to form an interior and/or exterior wall panel product, or other construction panel. Consistent with such an implementation, a woven or non-woven facing may be adhered to one, or both, exterior faces of the construction panel. For example, in one particular illustrative example embodiment, a non-woven fiberglass (such as E-glass, AR-glass, C-glass, D-glass, ECR-glass R-glass or S-glass, etc.) may be applied to one, or both, faces of a construction panel, for example, using a urea formaldehyde binder, acrylic coating, or other suitable bonding means. In some implementations, such a facer may increase the flexural strength of a construction panel by as much as 50%. It will be appreciated that various additional and/or alternative facer materials and structures may be utilized.

Consistent with some example embodiments, reinforcing the geopolymer cement may include providing one of a woven and a non-woven internal reinforcement. For example, a mesh or scrim, or other reinforcing structure, may be internally disposed within a geopolymer cement structure. In one particular example embodiment, in which the geopolymer cement structure may include an interior and/or exterior wall panel product, or other construction panel, the panel may be formed with at least one fiberglass mesh internally disposed within the panel. In some example embodiments, a construction panel product (such as an interior and/or exterior wall panel product) may include more than one internal reinforcement. For example, in particular embodiment an interior and/or exterior wall panel may be provided including three layers of internal reinforcement. In one such embodiment, the interior and/or exterior wall panel may include a reinforcement, such as a woven or non-woven fiberglass scrim or mesh, which may be generally centrally disposed within the wall panel. Further a reinforcement, such as a woven or non-woven fiberglass scrim or mesh, may be partially and/or fully embedded in the geopolymer cement adjacent each of the two faces of the wall panel. It will be appreciated that other variations may equally be utilized. For example, the panel may be formed in a continuous extrusion process (and/or any other suitable process). During the extrusion of the panel, the mesh may be pressed into the panel, such that the geopolymer cement forms around the mesh prior to hardening. Further, in some extrusion processes, the mesh may be positioned between two extruded layers of geopolymer cement, such that the two layers merge into a single body via the openings in the mesh. Further, in some implementations, the mesh may be fed through an extrusion head, such that the extruded geopolymer cement is extruded around the mesh, thereby integrating the mesh into the extruded panel. It will be appreciated that a variety of additional and/or alternative processes may be utilized for integrating a reinforcing structure (including, but not limited to a mesh) into a geopolymer cement structure, including a construction panel and/or any other structure.

In some implementations, the geopolymer cement binder may further include a viscosity control agent. Consistent with such embodiments, viscosity control agents may be utilized to provide cement viscosities appropriate to production requirements of the geopolymer cement products being manufactured. Further, in some embodiments, viscosity control agents may be utilized, at least in part, to control dispersibility of powdered components (e.g., of the geopolymer cement binder and/or powdered components that may be otherwise added to the geopolymer cement), to adjust water consumption and/or utilization (e.g., as discussed in further detail below), and/or to adjust the flowability of the mixed geopolymer cement. Further, in some example embodiments, viscosity control agents may be utilized to help stabilize an aerated or chemically induced foam, for example, as may be used, at least in part, to reduce the density of a geopolymer cement, as discussed above. For example, in some implementations one or more viscosity control agents may be utilized to stabilize an aerated or chemically induced foam during the setting, or hardening, of the geopolymer cement, which may, at least in part, aid in promoting a more uniform density and/or void size throughout the geopolymer cement product. As such, the one or more viscosity control agents may aid in achieving a geopolymer cement product that may exhibit more uniform or consistent physical and/or mechanical properties.

Consistent with the foregoing, in some implementations the viscosity control agent may include a viscosity reducer, such as a superplasticizer. Consistent with some embodiments, examples of superplasticizers may include, but are not limited to, high or mid-range water reducers, as discussed in greater detail below. Further, in some implementations, the viscosity control agent may include thickeners to increase viscosity. Illustrative example thickeners, e.g., that may be utilized, at least in part, for increasing viscosity and mix stability may include thickeners based on cellulosic gums, fatty acid alcohol or mixtures of fatty acid alcohols, and in one embodiment, a polysaccharide gum. Additionally, some embodiments of useful viscosity control agents may include rhamsan gums, xanthan gums, guar gums, and locust bean gums.

Consistent with some embodiments, such viscosity control agents may utilize high or medium range water reducers, e.g., which may, in some embodiments, increase the dispersibility of powders in geopolymer cement slurries, and may also, in some embodiments, better utilizes the water to help keep water to cement ratios down. That is, for example, the viscosity control agent may include a water-reducing admixture, or agent, that may, in some implementations, reduce the required water content for a concrete mixture by about 5 to about 10 percent. Consequently, concrete containing a water-reducing admixture may utilize less water to reach a required slump than untreated concrete (i.e., concrete not including a water-reducing admixture). The treated concrete (i.e., concrete including a water-reducing admixture) may have a lower water-cement ratio. In some implementations, this may indicate that a higher strength concrete can be produced without increasing the amount of cement. Some recent advancements in admixture technology have led to the development of mid-range water reducers. Mid-range water-reducer admixture may water content by at least 8 percent, in some implementations, and may tend to provide more stable concrete mixtures over a wider range of temperatures. Mid-range water reducers may, in some implementations, provide more consistent setting times than standard water-reducers For example, in some implementations, viscosity control agents may be capable of achieving water to cement ratios as low as 1:4. An illustrative example of such a product is a high range water reducer (HRWR) called MasterGlenium 7902, produced by BASF Construction Products Group, which may improve dispersibility of powders in the geopolymer cement slurry (e.g., during mixing and/or after mixing, but prior to setting or hardening), may adjust water consumption and/or utilization and flowability, and/or may aid in stabilizing a foam (e.g., which may be produced through mechanical aeration and/or using a chemical foaming agent). Illustrative examples of high range water reducers that have been identified as being effective may include, but are not limited to, viscosity control agents based on polycarboxylic acid derivatives, and/or naphthalene sulfonates (e.g., such as sulfonated naphthalene formaldehyde condensate, sulfonated melamine formaldehyde condensate, acetone formaldehyde condensate and polycarboxylate ethers). In some particular examples, between about 0.01% to about 2.0% of a high-range water reducer may be utilized, based on the weight of the geopolymer cement binder, to achieve the desired effects.

Consistent with some implementations, the geopolymer cement binder may further include an alkali stabilizing activator to increase the pH of the geopolymer cement. In some example embodiments, the use of alkali stabilizing activators may increase and maintain the pH of the geopolymer cement mix during the hardening stage, which may, in some embodiments, improve strength properties of the resulting geopolymer cement. However, it has been recognized that in some implementations, the inclusion of some higher pH activators (e.g., such as NaOH and/or Na metasilicate) may tend to "over activate" the geopolymer precursor breakdown, and may reduce the formation of properly formed cement phases, which may not be as strong as properly formed cement phases. In some illustrative example embodiments, the alkali stabilizing activators may include, but are not limited to, silicon dioxide ($SiO_2$), sodium aluminate, aluminum oxide ($Al_2O_3$), sodium lactate, calcium lactate, calcium nitrate, calcium nitrite, calcium gluconate, magnesium lactate, and/or magnesium gluconate.

As generally discussed above, the geopolymer cement binder may be mixed with water using one or more of high speed mixing and high shear mixing. Consistent with some embodiments, the water content may be between about 15% to about 40% relative to the geopolymer cement binder. Further, in some particular illustrative example embodiments, the water content may be between about 20% to about 30% relative to the geopolymer cement binder. Further, in some particular illustrative example embodiments, the water content may be between about 20% to about 35% relative to the geopolymer cement binder.

As generally discussed above, mixing the geopolymer cement binder with water may utilize high shear mixing. Consistent with the present disclosure, the use of high shear mixing techniques has unexpectedly been found to allow the magnesium oxide reacted geopolymer cement matrices to reach high levels of strength, fire resistance, and mold resistance, which are typically associated with geopolymer cements that utilize much more chemically aggressive alkali activators. For example, consistent with some illustrative example embodiments, the kinetic energy produced by the high shear mixing may mechanically breakdown the geopolymer cement precursor particles and/or the magnesium oxide particles. Breaking down the particles in this manner may create more reactive, smaller particles and/or may expose the raw materials of the geopolymer cement. These particles may then exhibit a larger reactive surface area, which may allow the particles to attach and/or react with the other ingredients in the geopolymer cement mix, which may facilitate producing the crystals needed for geopolymer cements. For example, the desired crystals needed for producing geopolymer cements may advantageously be formed through relatively quick interactions of the multiple materials integrating and/or reacting together at substantially the same time. Accordingly, contrary to conventional techniques that rely on high alkali chemicals to breakdown the geopolymer cement precursors, some embodiments of the present disclosure may utilize mechanical activation and/or enhancement of the geopolymer cement formation reactions. As such, consistent with some embodiments, it may be possible to utilize more user-friendly, lower alkali activators for the formation geopolymer cements.

For example, in some illustrative example embodiments, the strength of the cement may be, at least in part, derived from the ability for the magnesium oxide to react with the breakdown products of the geopolymer cement precursors (e.g., such as slag, fly ash, etc.). For example, in some embodiments, the greater cement phases may be from the hydrotalcite and M-S-H (magnesium-silicate-hydrate). That is, in some particular illustrative example embodiments, it has been observed (e.g., via x-ray diffraction analysis) that relatively stronger and/or more fire resistant geopolymer cements may be obtained in cements including hydrotalcite and M-S-H crystalline phases. As such, crystalline phases of this variety may be termed "greater cement phases," and/or desirable cement phases. In some implementations, the higher shear mixing action may provide greater breakdown of the geopolymer cement precursors, and may improve the formation of the desired cement phases. As such, through the use of magnesium oxide the mixes and processes may be much more user friendly in that the use of less caustic and less dangerous magnesium oxide activators may be utilized to promote greater safety, e.g., as compared to the use of more caustic activators. Consistent with some implementations, the disclosed magnesium oxide activated geopolymer cements may utilize not only a chemical alkalizing breakdown of the geopolymer precursor, but may also utilize a mechanical breakdown of the magnesium oxide and/or the geopolymer precursor to aid in releasing the reactive ions, which may react with the specific highly reactive grades of magnesium oxide particles that may also be further activated by the high speed and/or high shear mechanical action.

Consistent with the foregoing, in some illustrative embodiments, high shear mixing may provide sufficient mechanical action to cut into both the magnesium oxide and the geopolymer precursor, which may make both components more reactive, such that magnesium oxide, on its own, may be sufficient to be the sole alkalizing agent and react sufficiently to form the desired crystalline cement phases.

Consistent with one illustrative example embodiment, mixing the geopolymer cement binder with water using high shear mixing may include mixing with an overhead-type mixer having a toothed dispersion blade. In one particular illustrative embodiment, an overhead-type mixer capable of rotation speeds up to about 4500 rpm may be utilized. For example, in some illustrative example embodiments mixing speeds may be between about 3,200 rpm to about 6,000 rpm. Further, in some illustrative example embodiments, it has been found that high shear mixing, e.g., which may utilize a slower blade mixing, may also provide sufficient shearing to mechanically breakdown the magnesium oxide and/or the geopolymer precursor, which may make one or both of the components sufficiently reactive to produce high quality (e.g., high strength, high fire resistance, and/or high mold resistance) geopolymer cement without the use of more caustic alkali activators. Consistent with some such embodiments, magnesium oxide, on its own, may be sufficient to be the sole alkalizing agent and react sufficiently to form the desired crystalline cement phases. In some particular illustrative example embodiments mixing the geopolymer cement binder with water using high shear mixing may include mixing with a rotor-stator high shear in line mixer capable of speeds up to 4000 rpm. For example, in some illustrative example embodiments, mixing speeds may be in the range from between about 2,800 rpm to about 6,000 rpm. It will be appreciated that a variety of additional and/or alternative high shear mixing techniques may be utilized to achieve the desired mechanical breakdown of the geopolymer cement precursors and/or the magnesium oxide, and/or other components of the geopolymer cement. Illustrative examples of such mixing techniques may include, but are not limited to, pin mixers, inline mixers, and multi-stage cylinder mixers, as well as various additional and/or alternative high shear mixers.

Consistent with some example embodiments, phosphates may also be included in the geopolymer cement binder, and/or added to the geopolymer cement mix (e.g., prior to hardening of the geopolymer cement). Illustrative example phosphates may include, but are not limited to, mono-potassium phosphate, sodium mono hydrogen phosphate, sodium di-hydrogen phosphate, magnesium mono-hydrogen phosphate, magnesium di-hydrogen phosphate, lithium mono hydrogen phosphate, lithium di-hydrogen phosphate, and/or combinations thereof. In some embodiments, the addition of phosphates may increase water resistance of the resulting cement and/or may increase the physical properties of the resultant cement. In some implementations, the further incorporation of phosphates may create magnesium phosphate cement domains within the resultant cement.

In one particular illustrative example embodiment, a geopolymer cement formulation was prepared include magnesium oxide at 10% of the geopolymer cement binder weight with 80% by weight of Class F fly ash, 4% of sodium silicate (and including various additional additives) and a water-to geopolymer cement binder content of about 25% was used. This cement mix produced the crystalline phases, as identified by use of x-ray diffraction, shown in FIG. 1.

Figure 2:
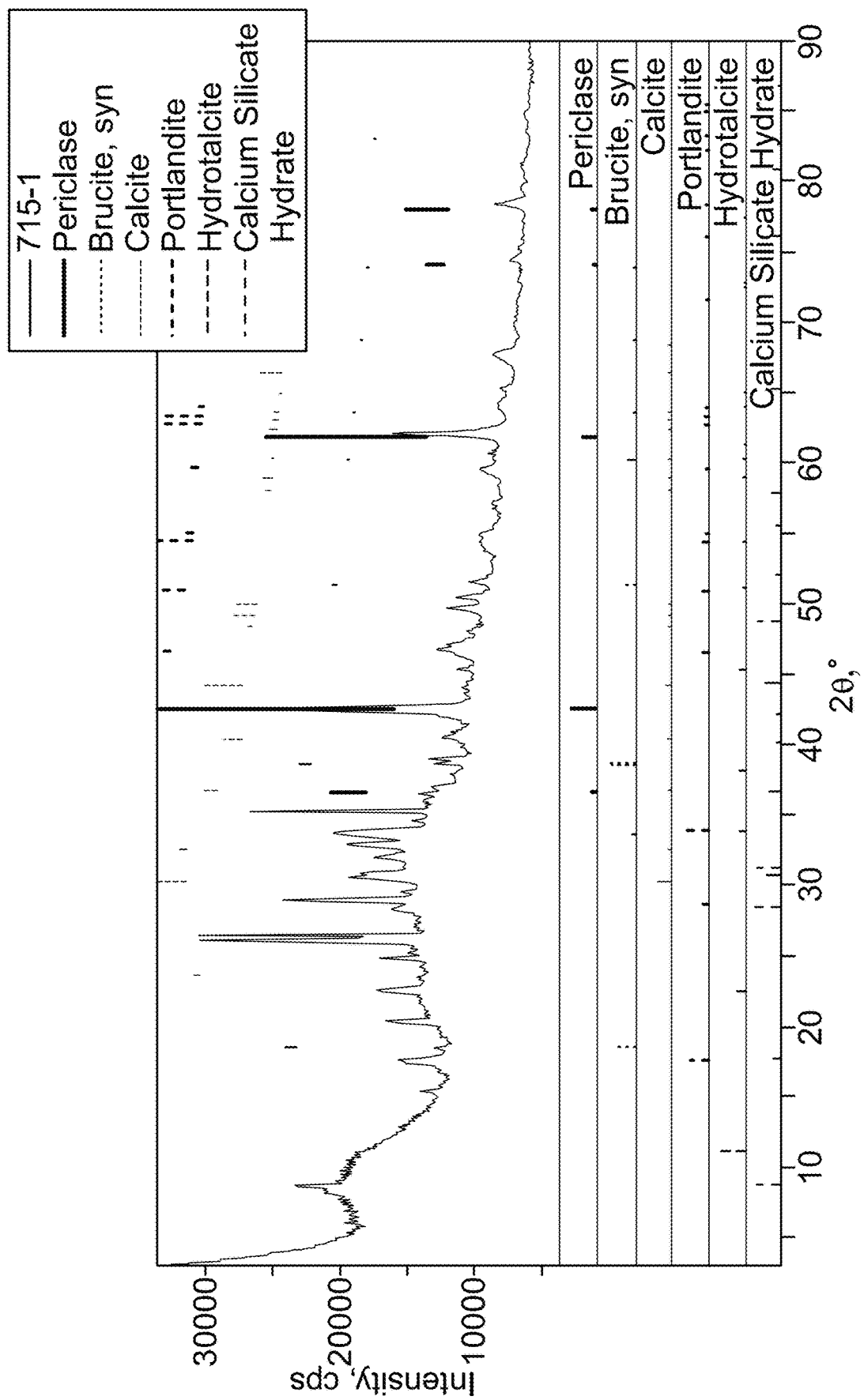
FIG. 2 is an x-ray diffraction plot of another example geopolymer cement consistent with an illustrative example embodiment.

In another particular illustrative example embodiment, a geopolymer cement formulation was prepared using 6% magnesium oxide by weight of the geopolymer cement binder, 90% ground granulated blast furnace (GGBF) slag by weight of the geopolymer cement binder, and 4% Sodium Silicate (NaSiO$_3$) by weight of the geopolymer cement binder, with a water to geopolymer cement binder ratio content of about 36%. The x-ray diffraction analysis showed that the resultant geopolymer cement exhibited the crystalline cement phases as shown in FIG. 2. During various experimental trials, the grades of fly ash that were tested included both Class F and C. Consistent with some particular embodiments, Class C was found to be beneficial as it has a higher content of calcium silicate, which may be useful in forming complexes with the magnesium in the magnesium oxide to form the magnesium-calcium-silicate-hydrate (Hydrotalcite) crystalline cement phase. However, Class F fly ash has also been found to provide useful geopolymer cements.

Figure 3:
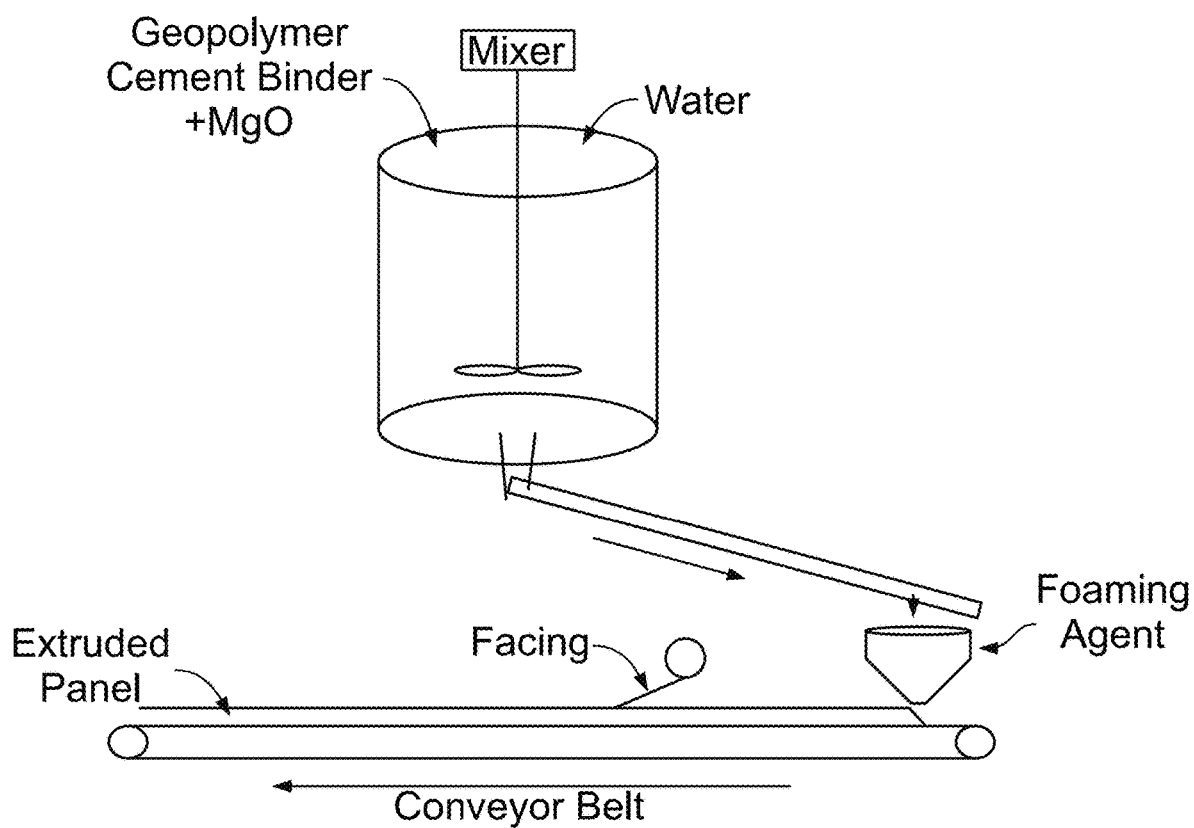
FIG. 3 diagrammatically depicts an illustrative example conveyer extrusion process, consistent with an illustrative example embodiment.

As generally discussed herein, geopolymer cements consistent with the present disclosure may be useful in a wide variety of applications. In some particular applications, geopolymer cements may be utilized to produce construction panels, such as interior and/or exterior wall panel products, as well of various other construction products. Consistent with one particular implementation, producing a construction panel may further include shaping the geopolymer cement, in an uncured state, into a sheet. For example, in some manufacturing embodiments, the mixed geopolymer cement may be extruded in a continuous operation, e.g., by extruding the geopolymer cement mix onto a conveyor, as generally shown in FIG. 3. In some embodiments, the method may further include facing at least one surface of the sheet with a facing mat material, e.g., such as, but not limited to, a facing mat material. For example, and as generally described above, in some implementations a woven and/or non-woven facing may be adhered to and/or embedded in at least one face of the extruded geopolymer cement (e.g., either before or after at least partial hardening of the geopolymer cement and using either an appropriate bonding agent, and/or mechanical bonding with at least partially unhardened geopolymer cement). Further, in some embodiments, the method may further include applying a reinforcing layer to at least one surface of the sheet, and/or integrating reinforcing materials into the geopolymer cement. For example, and as also generally described above, in some embodiments, reinforcing fibers may be mixed with the geopolymer cement (e.g., included as part of the geopolymer cement binder, and/or added to the geopolymer cement during mixing). Further, in some embodiments, reinforcing materials (e.g., such a woven or non-woven scrim or mesh) may be embedded in the unhardened geopolymer cement and/or may be adhered to a surface of the extruded geopolymer cement (e.g., by at least partially embedding the reinforcing materials into a surface of unhardened geopolymer cement and/or using an appropriate bonding agent between the reinforcing materials and the geopolymer cement). Various additional and/or alternative implementations may equally be utilized.

Further, consistent with some illustrative example embodiments, a method may include shaping a geopolymer cement (e.g., consistent with the foregoing disclosure), in an uncured state, into a continuous and/or non-continuous, moving or stationary, composite magnesium structural panel or panels. The method may further include facing at least one surface of the continuous and/or non-continuous, moving or stationary, composite magnesium structural panel or panels with a facing material. In some illustrative example embodiments, a method may further include applying a reinforcing layer to, within, and/or throughout, at least one of the continuous and/or non-continuous, moving or stationary, composite magnesium structural panel or panels. In some illustrative example embodiments, the reinforcing layer may, in itself, be, by composition, similar to, and/or a composite of an inner encapsulated higher and/or lower density geopolymer cement. In some implementations, the reinforcing layer may be attributed to a circumferring layer wrapping the entirety, a substantial portion, and/or at least a portion, of the encapsulated higher and or lower density geopolymer cement core. In some illustrative example embodiments, the circumferring layer may, or may not, consist of the same, and/or a similar, formulation as the inner geopolymer cement core. In some example implementations, the circumferring layer may be a composite of similar components, and/or may include other additives and or components, which may be intended to impart enhanced performance and/or economic characteristics unique to one or more embodiments consistent with the present disclosure. For example, in some illustrative example embodiments, unlike the generally dense surface layers of typical gypsum wallboard and/or gypsum building panels, a geopolymer and/or composite geopolymer circumferring layer may not need to maintain specific density ranges when applied to a lower density core of identical, substantially similar, and/or generally similar, material composition. This may offer, at least in part, a new novelty specific to the unique capabilities existent and attainable with the geopolymer technology disclosed herein. Additionally, in some illustrative example embodiments, unlike some traditional magnesium building panels, whether magnesium-based formulas incorporating primary, secondary and or tertiary compound additives intended to negate the widely known and widely accepted high cost of magnesium board formulations, a geopolymer circumferring layer encapsulating the geopolymer higher and/or lower density core may, for the first time, provide a cement formulated building panel that may create the unique opportunity for a magnitude of manufacturing economic efficiency improvements, which, while yielding a composite magnesium structural panel intended for building construction, is now, where it was not before, a cost effective measure to incorporate concepts disclosed herein into all standard practices regardless of residential and or commercial methodology while imparting both superior and unique properties and performance characteristic of the geopolymer composite magnesium structural panel consistent with some implementations of the present disclosure.

Consistent with the foregoing, according to some illustrative example embodiments, an interior and/or exterior wall panel, or other construction panel, may be provided. The wall panel may include a geopolymer cement sheet including a geopolymer precursor reacted with a magnesium oxide alkali activator and water under one or more of high speed mixing and high shear mixing. The wall panel may further include one of a facing material and a reinforcing layer bonded to and/or embedded into a surface of the geopolymer cement sheet.

Consistent with some example embodiments, geopolymer cements consistent with the present disclosure may be utilized for producing construction products including, but not limited to concrete roof tiles, backer boards, structural insulated panels (SIP), exterior panels and facades, concrete blocks and bricks, stuccos, artificial rocks, concrete structural elements, line stripping, fire doors, interior and/or exterior wall panels, as well as many other related construction products. In some implementations, it may be possible to provide a construction panel that may provide fire resistance for up to four-hours or more with a single panel as thin as about ⅜ inch up to about 1.0 inch in thickness. Such construction panels may provide suitable and/or superior replacements for conventional gypsum-based panels, fiber filled ordinary Portland cement panels, magnesium oxychloride panels, and/or magnesium oxy-sulfate panels. Further consistent with some embodiments, e.g., which may include density reduction, it may be possible to provide construction products that may exhibit high fire resistance and/or heat barrier protection at different densities. In addition to fire resistance, in some implementations, construction products utilizing geopolymer cements consistent with some embodiments of the present disclosure may additionally provide mold and/or mildew resistance.

Additionally, as generally described, in some example embodiments, construction products may be produced from geopolymer cements consistent with some embodiments of the present disclosure which may include various reinforcing materials. In some such implementations, the reinforcing materials may provide increased flexural strength, may reduce and/or minimizing shrinkage cracking from thermal shock of fast falling furnace temperatures, e.g., as has been experimentally observed when removing test specimens from an 1,850 degree F., or higher (e.g., up to 2,200 degree F. or even higher), gas furnace and cooling down to ambient during the test methodology of ASTM E119. In some experimental testing of construction panels utilizing geopolymer cement consistent with some embodiments of the present disclosure both an electric muffle furnace as well as a propane gas generated furnace were used to determine wall assembly performance in modified ASTM E119 specifications. It was noted in some testing that some construction panels exhibited an interesting phenomenon seen in ceramics type applications where the exposed surface of the magnesium oxide activated geopolymer construction panels actually develop sintering and/or fusing of the geopolymers under higher temperature conditions which provided increased fire resistance by reducing temperature transmission through the wall panel. This was observed to keep the fire away from the other side of a wall for longer time periods at temperatures reaching and exceeding 2,000 degrees F. The experimentally tested panels appeared to actually act in a refractory way, which may make them especially useful for high temperature resistance.

Further, consistent with some example embodiments, products (including, but not limited to construction products) utilizing geopolymer cement consistent with some embodiments of the present disclosure may exhibit greatly improved water resistance, mold resistance, and/or mildew resistance, e.g., as compared to conventional gypsum-based construction products.

Consistent with the foregoing, some illustrative example applications in which some embodiments of geopolymer cement consistent with the present disclosure may find beneficial use may include, but are not limited to, any of the following:

Fire-resistant wall panels, floorboards or roof panel systems where a fire barrier is required for desired fire ratings. Examples of such fire-walls may include shaft liners around elevators or fire-wall separations in commercial buildings or apartments where a building code requires that fire or smoke cannot be passed from one area to another area for a minimum of, e.g., 1, 2, 3, 4 or more hours.

Ballistic panels and/or walls and safe rooms. Geopolymer cement manufactured consistent with some embodiments of the present disclosure may result in very high compressive strengths, and when combined with hard aggregates such as granite, may provide excellent systems that are antiballistic and may be able to withstand impact from bullets and/or other projectiles. Panels may be made more flexible and/or thinner incorporating glass, metal and/or nylon mesh that may bind tenaciously to the geopolymer cement matrix. Walls and panels developed for this use may also be useful in providing blast barriers for critical areas subject to explosions such as airports, embassies, chemical plants and fuel depots. Additionally, the use of geopolymer cements consistent with some embodiments of the present disclosure may be used to replace gypsum boards that are commonly used for wall boards in safe rooms, and may, in some situations, be capable of achieving up to a 4-hour (or more) fire rating using the ASTM E119 test, compared to only 1-hour typically observed with conventional gypsum boards in a single ½" or ⅝" board thicknesses.

Structural and non-structural walls, roofing and flooring and other support structures for residential and commercial building construction including structural insulated panels (SIP), interior and exterior wall panels, backer boards, exterior facades, and a geopolymer matrix foam, e.g., which may replace either polystyrene or polyurethane foam insulating materials in the center of an SIP panel.

Concrete blocks, bricks and tiles, tile backer boards and other precast cement elements.

Exterior and interior roof coatings and panels. The relatively higher strength and earlier strength development properties of some geopolymer cements and/or products consistent with some embodiments of the present disclosure may be well suited for use on any roofing material, including on Styrofoam insulating panels. This may provide water, mildew, fire, bacteria and algal, wear, abrasion and impact resistance to the roof while helping maintain proper insulation properties and chemical resistance.

Spray coatings to impart fire resistance, mold and mildew resistance, impact resistance and other related properties on surfaces including, but not limited to, gypsum boards, wood, OSB panels, asphaltic or other flammable roof shingles, plastic or any other fire prone/combustible building facades.

Other miscellaneous applications include 3D printing, wood roof trestles and trusses, steel and concrete beams for high-rise buildings, and artificial rocks or boulders.

Consistent with the foregoing, geopolymer cement products consistent with some embodiments of the present disclosure may be used for a multitude of construction applications where increased fire-resistance may be desired and/or required. Producing construction panels made consistent with some embodiments of the present disclosure may allow for wall assemblies that can provide fire barriers for at least 2-hours, and perhaps up to 4-hours or more, using single wall panels of ½" or ⅝" in thickness, e.g., as compared to gypsum boards that may typically require multiple boards to achieve anything greater than a 1-hour fire rating. For example, if a building code requires a 4-hour fire rating, current gypsum boards may often require a wall assembly with four (4) Type X or Type C boards of usually ⅝" thickness each, and assembled together (totaling 2½" of total space). Boards utilizing geopolymer cement consistent with some embodiments of the present disclosure may accomplish the same, or better, fire barrier protection using only one (1) board of ⅜" or ½" or ⅝" or ¾" or 1.0" in thickness, and/or any other suitable thickness.

A variety of illustrative example embodiments have been described, each including a variety of features, concepts, formulations, and arrangements. It will be appreciated that features, concepts, formulations, and arrangements disclosed in the context of one, or several, discrete embodiments are susceptible to application in other embodiments, and/or susceptible to combination with features, concepts, formulations, and/or arrangements discussed relative to multiple different embodiments. Herein, such combination of features, concepts, formulations and arrangements from the several embodiments is expressly intended to be within the scope of the present disclosure.

A variety of feature, advantages, implementations, and embodiments have been described herein. However, it will be appreciated that the foregoing description and the depicted embodiments are only intended for the purpose of illustration and explanation, and should not be construed as a limitation on the present invention. It will be appreciated that the features and concepts associated with the various embodiments are susceptible to combination with features and concepts of other disclosed embodiments. Additionally, it will be appreciated that the concepts embodied by the description and illustration are susceptible to variation and modification, all of which are intended to be encompassed by the present invention.

What is claimed is:

1. A method of producing geopolymer cement comprising:
    providing a geopolymer cement binder comprising:
        a geopolymer precursor; and
        magnesium oxide as an alkali activator; and
    mixing the geopolymer cement binder with water including mechanically breaking down one or more of the geopolymer precursor and the magnesium oxide to react and form one or more of hydrotalcite phases and magnesium-silicate-hydrate phases, wherein mixing the geopolymer cement binder with water includes using high shear mixing including one or more of:
    mixing with an overhead mixer having a toothed dispersion blade;
    mixing with a rotor-stator high shear in line mixer; and
    mixing with a multi-stage cylinder mixer.

2. The method according to claim 1, wherein the geopolymer precursor includes a material containing amorphous silicates of one or more of calcium, aluminum, and magnesium.

3. The method according to claim 2, wherein the geopolymer precursor includes one or more of:
    slag cements;
    fly ash;
    metakaolin;
    fumed silica; and
    rice husks.

4. The method according to claim 1, wherein the geopolymer cement binder includes between about 10% to about 95% of the geopolymer precursor by weight of the geopolymer cement binder.

5. The method according to claim 1, wherein the magnesium oxide includes magnesium oxide calcined to exhibit a caustic magnesia activity neutralization time of between about 9 seconds to about 30 seconds using a 1.0N acetic acid.

6. The method according to claim 1, wherein the magnesium oxide exhibits a magnesium oxide purity from between about 75% to about 99%.

7. The method according to claim 1, wherein the geopolymer cement binder includes between about 1% to about 50% magnesium oxide by weight of the geopolymer cement binder.

8. The method according to claim 1, wherein the geopolymer cement binder further includes a co-alkali activator.

9. The method according to claim 8, wherein the co-alkali activator includes one or more of:
    sodium silicate having a formula $Na_2SiO_3 \cdot nH_2O$, where n=one of 5, 6, 8, 9;
    potassium silicate;
    sodium metasilicate;
    sodium hydroxide;
    sodium aluminate;
    sodium carbonate;
    hydrated lime;
    quick lime;
    dolime;
    hydrated dolime;
    potassium oxide;
    lithium oxide;
    alumina;
    iron oxide;

nickel oxide;
copper oxide;
sodium lactate;
ordinary Portland cement; and
calcium gluconate.

10. The method according to claim 8, wherein the geopolymer cement binder includes an amount of co-alkali activator that is equal to or less than an amount of the magnesium oxide by weight.

11. The method according to claim 1, further including carbonating the geopolymer cement one of during mixing and after mixing.

12. The method according to claim 11, wherein carbonating the geopolymer cement includes one or more of:
adding carbon dioxide to one or more of the water and the geopolymer cement including one or more of bubbling carbon dioxide and injecting carbon dioxide into one or more of the water and the geopolymer cement;
providing the geopolymer cement binder further including a powdered carbonate including one or more of sodium carbonate, lithium carbonate, sodium bicarbonate, sodium percarbonate, and sodium sesquicarbonate.

13. The method according to claim 1, further comprising providing a density reduction of the geopolymer cement.

14. The method according to claim 13, wherein providing the density reduction of the geopolymer cement includes one or more of:
aerating the geopolymer cement after mixing the geopolymer cement and before setting of the geopolymer cement; and
incorporating a density reduction additive with one or more of the geopolymer cement binder and the geopolymer cement.

15. The method according to claim 14, wherein aerating the geopolymer cement includes one or more of:
physically aerating the geopolymer cement including bubbling air through the geopolymer cement after mixing the geopolymer cement and before setting of the geopolymer cement;
chemically aerating the geopolymer cement using one or more of a chemical aeration agent and a foaming agent.

16. The method according to claim 14, further including adding a density reduction additive to the geopolymer cement, wherein the density reduction additive includes a lightweight material, including one or more of: expanded polymers, expanded polystyrene, perlite, vermiculite, hollowed glass beads, crushed glass, zeolites, and mica.

17. The method according to claim 1, wherein the geopolymer cement binder further includes one or more of a ceramic material and a heat expandable material providing one or more of heat resistance and thermal shock resistance for the geopolymer cement.

18. The method according to claim 1, further comprising reinforcing the geopolymer cement including one or more of:
providing the geopolymer cement binder further including one or more of chopped organic fibers, chopped inorganic fibers including one or more of fiberglass fibers, basalt fibers, polyolefin fibers, stainless steel fibers, and nylon fibers;
providing one of a woven and a non-woven mat facing for the geopolymer cement; and
providing one of a woven and a non-woven internal reinforcement.

19. The method according to claim 1, wherein the geopolymer cement binder further includes a viscosity control agent, including one or more of:
a viscosity reducer including a superplasticizer; and
a thickener including one or mor of cellulosic gums, a fatty acid alcohol, a mixture of fatty acid alcohols, and a polysaccharide gum.

20. The method according to claim 1, wherein the geopolymer cement binder further includes an alkali stabilizing activator to increase the pH of the geopolymer cement.

21. A method of producing geopolymer cement comprising:
providing a geopolymer cement binder comprising:
a geopolymer precursor; and
magnesium oxide as an alkali activator; and
mixing the geopolymer cement binder with water using high shear mixing including one or more of:
mixing with an overhead mixer having a toothed dispersion blade;
mixing with a rotor-stator high shear in line mixer; and
mixing with a multi-stage cylinder mixer.

22. The method according to claim 1, further comprising shaping the geopolymer cement, in an uncured state, into a sheet.

23. The method according to claim 22, further comprising one of:
facing at least one surface of the sheet with a facing material; and
one or more of applying a reinforcing layer to at least one surface of the sheet, at least partially embedding the reinforcing layer into at least one surface of the sheet, and fully embedding the reinforcing layer into the sheet.

24. A construction panel comprising:
a geopolymer cement sheet comprising a geopolymer precursor reacted with a magnesium oxide alkali activator and water forming one or more of hydrotalcite phases and magnesium-silicate-hydrate phases; and
one of a facing material and a reinforcing layer bonded to a surface of the geopolymer cement sheet.

* * * * *